Patented Nov. 30, 1937

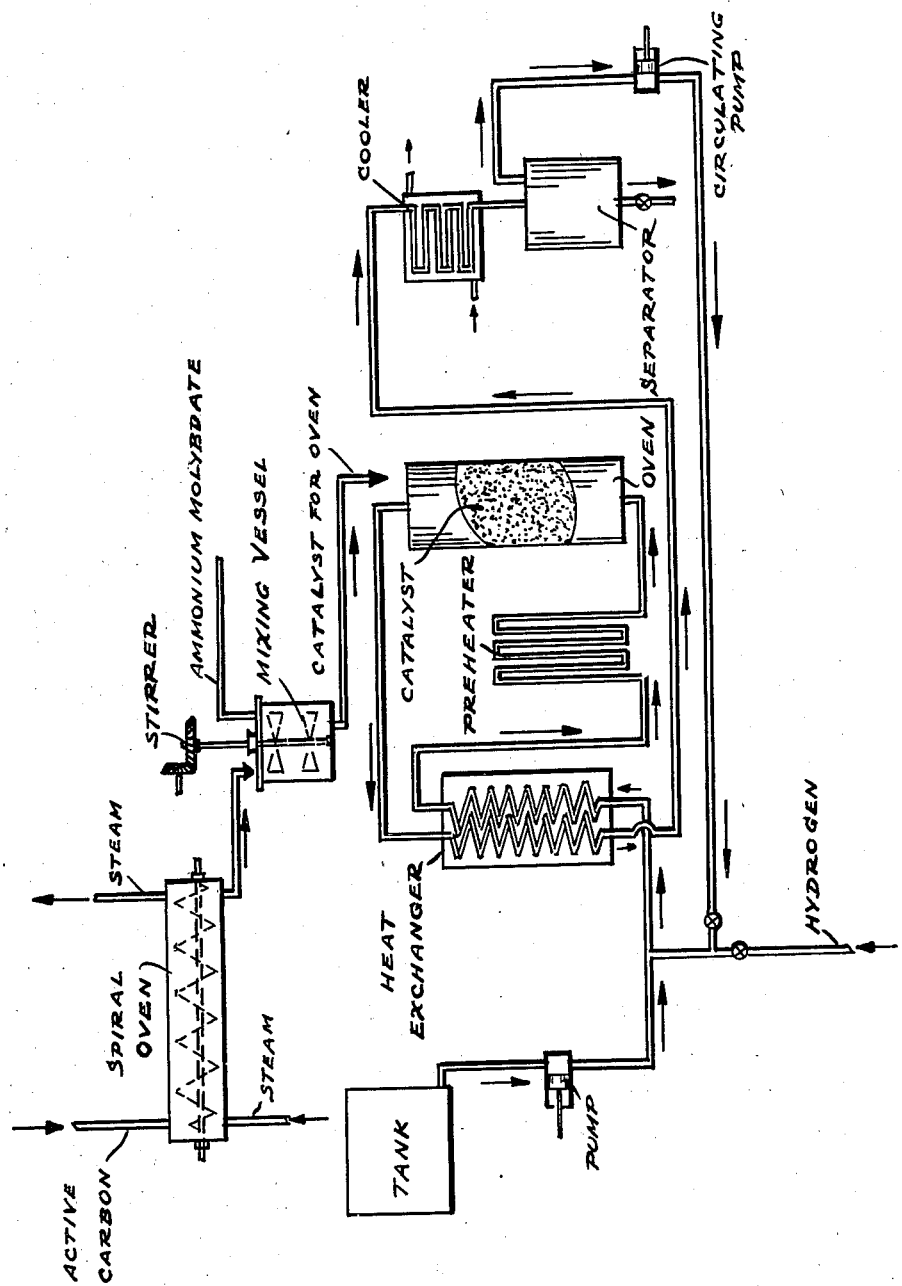

2,100,352

UNITED STATES PATENT OFFICE 2,100,352

CATALYTIC REACTION

Mathias Pier, Heidelberg, and Walter Simon and Paul Jacob, Ludwigshafen-on-the-Rhine, Germany, assignors to I. G. Farbenindustrie Aktiengesellschaft, Frankfort - on - the - Main, Germany Application January 10, 1934, Serial No. 706,044
In Germany January 17, 1933

7 Claims. (Cl. 196—53)

The present invention relates to improvements in carrying out catalytic reactions, in particular the destructive hydrogenation of distillable carbonaceous materials of the nature of coals, tars, mineral oils and their distillation and conversion products.

In the production of valuable products by treatment with hydrogenating gases, especially in the destructive hydrogenation of the aforesaid distillable carbonaceous materials it has already been proposed to employ as catalysts carriers which have been provided with a catalytic material.

According to a further suggestion the activity of the said catalysts can be increased by treating the carrier with hydrogen or a gas containing hydrogen at elevated temperatures and preferably under pressure before providing it with all of the catalytically active substance.

We have now found that very active catalysts for the said reactions are obtained by treating carriers containing carbon, such as active carbon, coke and the like, or mixtures of these substances with other carriers, which have previously been activated by means of solid or liquid chemical agents, such as phosphoric acid or zinc chloride or potassium carbonate, or by means of gases, such as steam, at temperatures below 500° C., with steam or with the oxides of carbon, namely with carbon monoxide or carbon dioxide, at a temperature above 500° C., if desired under pressure, before or after providing them with all of the catalytically active substance.

It is advantageous to carry out the treatment of the carrier, which is preferably in a finely divided or shaped condition, with steam at temperatures above 600° C., as for example at from 800° to 900° C. or more, if desired under a pressure of 5, 10, 50 or 100 atmospheres or more, the material thus becoming more porous and the catalyst with which it is provided more active.

Carbon dioxide or carbon monoxide may be employed together with, or instead of steam, for the treatment of the carriers.

The previous activation by means of chemical agents is preferably carried out with acids, as for example phosphoric acid, hydrochloric acid, sulphuric acid or organic sulphonic acids, or with salts hving an activating action, as for example zinc chloride.

In cases when the carriers containing carbon have already been subjected to a treatment with steam at low temperatures, as for example at from 450° to 500° C., it is necessary to repeat the treatment at higher temperatures.

As further examples of carriers to be activated in accordance with the present invention may be mentioned active carbons which have been activated with substances other than steam or the oxides of carbon; these are then subjected to the said treatment with steam or the oxides of carbon at high temperatures.

The carriers are provided before and/or after the said treatment with the catalytically active substances, as for example impregnated with a solution of one or more salts of a catalytically active element, as for example a metal of the 2nd to the 8th groups of the periodic system, especially molybdenum, tungsten, chromium, vanadium, rhenium, manganese, nickel or cobalt, or mixed with metal compounds, such as oxides, sulphides or halides and preferably pressed into pieces.

The basic constituents, such as the ashes, may be removed from the catalysts if desired.

In working up hydrocarbons of high boiling point by treatment with hydrogenating gases a catalyst prepared as herein described is added to the initial materials for example in an amount of 0.2 to 5 per cent or more.

The catalytically active substance may be mixed in a solid divided state with the carrier and, if desired, the mixture may be pressed into moulds. Another method of working is to allow the carrier to adsorb the catalytically active substance from a solution thereof. Advantageously the catalytically active substance is in a colloidal state when brought on to the carrier. Another method of bringing the catalytically active material on to the carrier is by precipitating the metal or metal compound on the carrier from the corresponding metal salt solutions. The catalytically active substance may prior to or during its application in the process undergo decomposition or conversion to form other catalytically active substances.

The amount of catalytic substance brought on to the carrier may vary greatly but the useful range is generally between 1 and 20 per cent by weight and in practice as a rule between 2 and 16 per cent by weight of the carrier.

The expression "treatment with hydrogenating gases of distillable carbonaceous materials" when employed in the present application is intended to comprise the most various reactions. Thus the expression includes the destructive hydrogenation of carbonaceous materials, in particular solid or liquid hydrocarbon products such as coal of all varieties, including lignite, other solid carbonaceous materials, such as peat, shales and wood, mineral oils, tars and the distillation, conversion and extraction products thereof. The said destructive hydrogenation may be used to produce hydrocarbons of all sorts, such as motor fuels and in particular antiknock motor fuels, solvent naphthas, middle oils, kerosene and lubricating oils. The said expression also includes the removal of non-hydrocarbon impurities, such as sulphur- or oxygen-containing substances or nitrogen compounds by the action of hydrogen or gases containing or supplying hydrogen from crude carbonaceous materials, for example the refining by treatment with hydrogen of crude benzol, of crude motor fuels or of lubricating oils. The said expression further includes the conversion of oxygen or sulphur containing organic compounds to produce the corresponding hydrocarbons or hydrogenated hydrocarbons, for example the conversion of phenols or cresols into the corresponding cyclic hydrocarbons or hydrogenation products thereof. Finally it includes the hydrogenation of unsaturated compounds and more particularly of unsaturated hydrocarbons or of aromatic compounds and more particularly of aromatic hydrocarbons, for example, to produce hydroaromatic hydrocarbons.

The catalysts in accordance with the present invention are especially valuable for the destructive hydrogenation of coals, tars and mineral oils.

The catalysts employed in accordance with the present invention, are very advantageous in the conversion of hydrocarbons rich in hydrogen, such as middle oil or benzine, into non-knocking motor fuel by treatment with hydrogen at temperatures above 500° C. and under high pressure.

The said reactions with hydrogen or hydrogen containing gases are usually carried out at temperatures between 200° and 700° C., preferably above 250° C., and as a rule between about 380° and 550° C. The pressures employed are usually in excess of 20 atmospheres and as a rule preferably in excess of 50 atmospheres. In some reactions, however, atmospheric pressure or pressures slightly above atmospheric, for example, pressures of 10 atmospheres may be employed. For example, in the refining of crude benzol rather low pressures, for example, of the order of 40 atmospheres give good results. Generally however pressures of about 100, 200, 300, 500 and in some cases even 1000 atmospheres come into question.

The amount of hydrogen maintained in the reaction space and parts connected therewith, if any, varies greatly with the nature of the particular initial materials treated or according to the result in view. In general 300, 600, 1000, 2000 cubic meters or more of hydrogen, measured under normal conditions of temperature and pressure, per ton of carbonaceous material treated may be used. The smallest amount of hydrogen employed per ton of carbonaceous material will be about 100 cubic meters of hydrogen and amounts of up to about 3000, 4000 cubic meters or more may be employed in many cases.

The catalysts prepared according to this invention are also very suitable for carrying out other catalytic reactions, as for example the splitting of liquid hydrocarbons of high boiling point into those of lower boiling point.

The drawing is a diagrammatic representation in partial sectional elevation of an apparatus suitable for the preparation and use of catalysts according to the present invention, and indicates the flow of materials.

The following example will further illustrate the nature of this invention but the invention is not restricted to this example.

*Example*

Pieces of active carbon which have been activated while employing phosphoric acid are treated with steam at 900° C. for from 3 to 5 hours. The tarry constituents present in the coal are thus removed with a decrease in volume (by about 25 per cent). The carbon thus pretreated is impregnated with a solution of ammonium molybdate containing sulphuric acid, the carbon thus absorbing about 15 per cent of molybdic acid; the resulting catalyst is arranged rigidly in a high-pressure chamber. If there be led thereover at 530° C. under a pressure of 200 atmospheres hydrogen together with a gas oil (boiling range from 200° to 300° C.) obtained by cracking Hanover petroleum, the partial pressure of the latter being 30 atmospheres, a product is obtained which consists about half of benzine and about half of middle oil. The middle oil is again led over the catalyst together with fresh oil. The benzine obtained by working in this way corresponds as regards its knocking properties with a mixture of 78 parts of iso-octane and 22 parts of normal heptane.

If, for the preparation of the said catalyst, the same active carbon be employed without its having been pretreated with steam in the said manner, the catalyst becomes impaired in its activity very rapidly, probably by reason of the coking of the tarry constituents still present in small amounts in the carbon, and continuous operation free from trouble is rendered impossible by the caking together of the pieces.

What we claim is:—

1. A process for heat-treating a distillable carbonaceous material with a hydrogenating gas which comprises acting with said hydrogenating gas upon the said distillable carbonaceous material at an elevated temperature suitable for said heat treatment while in contact with a catalyst consisting of an activated carrier containing carbon which after activation by an activating treatment at a temperature below 500° C. has been treated at a temperature above 500° C. with steam in the absence of said distillable carbonaceous material and which is provided with a substance catalytically promoting the said heat treatment with a hydrogenating gas.

2. A process for the destructive hydrogenation of a distillable carbonaceous material with a hydrogenating gas which comprises acting with said hydrogenating gas upon the said distillable carbonaceous material under conditions of temperature and pressure effecting said destructive hydrogenation while in contact with a catalyst consisting of an activated carrier containing carbon which after activation by an activating treatment at a temperature below 500° C. has been treated at a temperature above 500° C. with steam in the absence of said distillable carbonaceous material and which is provided with a substance catalytically promoting the said destructive hydrogenation.

3. A process for the destructive hydrogenation of a distillable carbonaceous material with a hydrogenating gas which comprises acting with said hydrogenating gas upon the said distillable carbonaceous material under conditions of temperature and pressure effecting said destructive hydrogenation while in contact with a catalyst consisting of active carbon which after activation by an activating treatment at a temperature below 500° C. has been treated at a temperature above 500° C. with steam in the absence of said distillable carbonaceous material and which is provided with a substance catalytically promoting the said destructive hydrogenation.

4. A process for the destructive hydrogenation of a distillable carbonaceous material with a hydrogenating gas which comprises acting with said hydrogenating gas upon the said distillable carbonaceous material under conditions of temperature and pressure effecting said destructive hydrogenation while in contact with a catalyst consisting of active carbon which after activation by an activating treatment at a temperature below 500° C. has been treated at a temperature between 600° and 900° C. with steam in the absence of said distillable carbonaceous material and which is provided with a substance catalytically promoting the said destructive hydrogenation.

5. A process for the destructive hydrogenation of a hydrocarbon with a hydrogenating gas which comprises acting with said hydrogenating gas upon the said hydrocarbon product at a temperature between 380° and 550° C. and under a pressure above 20 atmospheres while in contact with a catalyst consisting of an activated carrier containing carbon which after activation by an activating treatment at a temperature below 500° C. has been treated at a temperature above 500° C. with steam in the absence of said hydrocarbon product.

6. A process for heat-treating a distillable carbonaceous material with a hydrogenating gas which comprises acting with said hydrogenating gas upon the said distillable carbonaceous material at an elevated temperature suitable for said heat treatment while in contact with a catalyst consisting of a carrier containing carbon which has been activated by treatment with an acid agent at a temperature below 500° C. and which after activation has been treated, at a temperature above 500° C. and in the absence of said distillable carbonaceous material, with an agent selected from the group consisting of steam and the oxides of carbon.

7. A process for heat-treating a distillable carbonaceous material with a hydrogenating gas which comprises acting with said hydrogenating gas upon the said distillable carbonaceous material at an elevated temperature suitable for said heat treatment while in contact with a catalyst consisting of a carrier containing carbon which has been activated by treatment with an acid agent at a temperature below 500° C. and which after activation has been treated, at a temperature above 500° C. and in the absence of said distillable carbonaceous material, with steam.

MATHIAS PIER.
WALTER SIMON.
PAUL JACOB.